Sept. 27, 1932.  H. G. KLETT  1,879,320

VALVE

Filed April 15, 1930   2 Sheets-Sheet 1

Henry G. Klett INVENTOR.

BY

Irvin E. C. Konigsberg

ATTORNEY.

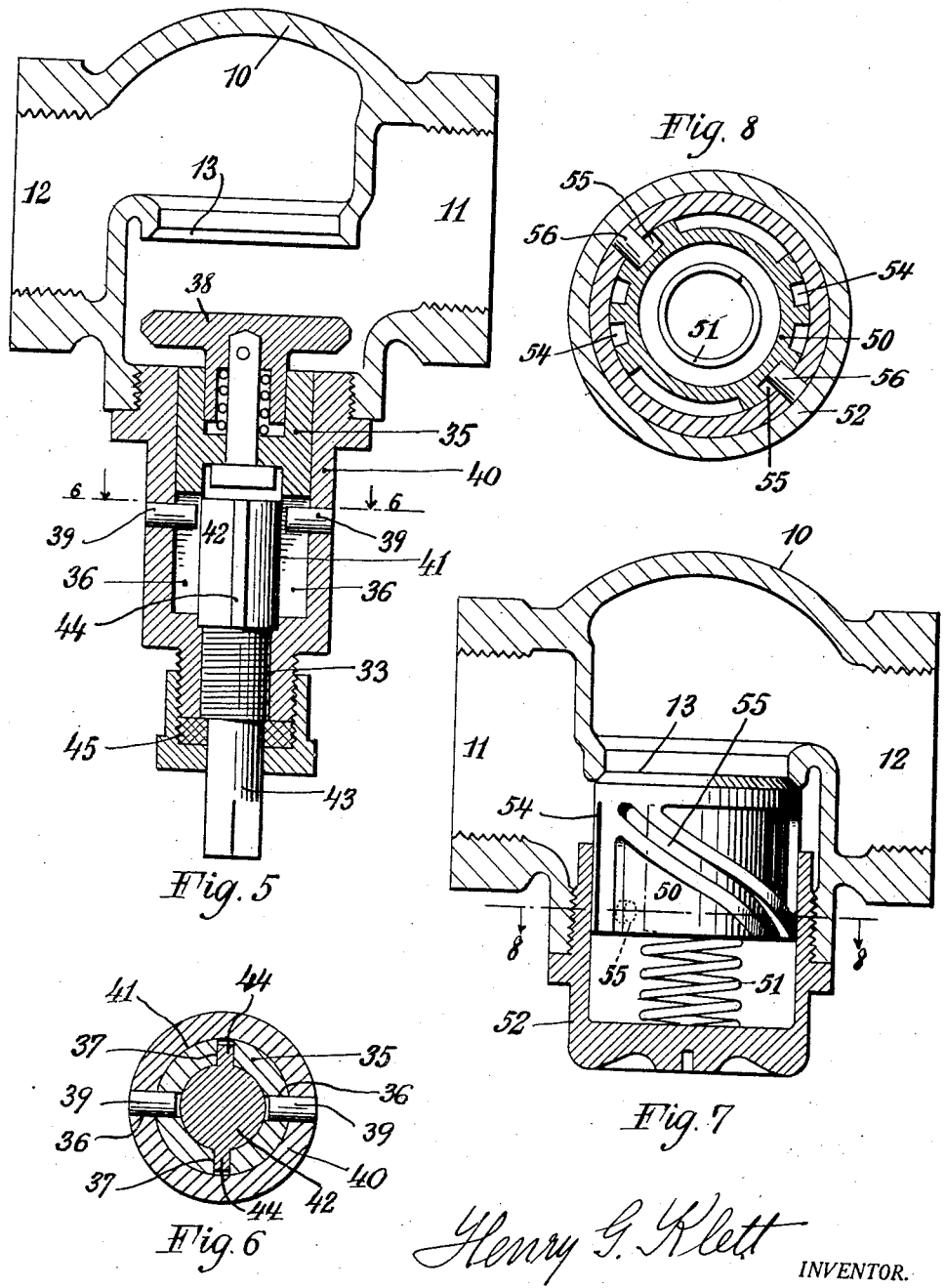

Patented Sept. 27, 1932

1,879,320

UNITED STATES PATENT OFFICE

HENRY G. KLETT, OF NEW YORK, N. Y.

VALVE

Application filed April 15, 1930. Serial No. 444,371.

The object of this invention is to provide a generally improved type of valve particularly suitable for use in ice making plants and like places. One object of the invention is to provide a valve mechanism having a quick opening and closing movement combined with means for relieving the back pressure on the valve itself.

Another object of the invention is to provide a valve which may be operated by a straight as well as by a rotary movement, the latter being preferably in some places where the water pressure is high. Other objects will appear as this specification proceeds while reference is had to the accompanying drawings in which Fig. 1 is a sectional view of a valve mechanism embodying the invention and showing the valve in open position.

Fig. 5 is a view similar to Figure 1 but showing a modification.

Fig. 6 is a sectional view on line 6—6 of Figure 5.

Fig. 7 is a sectional view of a check valve embodying the invention.

Fig. 8 is a sectional view on line 8—8 of Figure 7.

Figure 2:
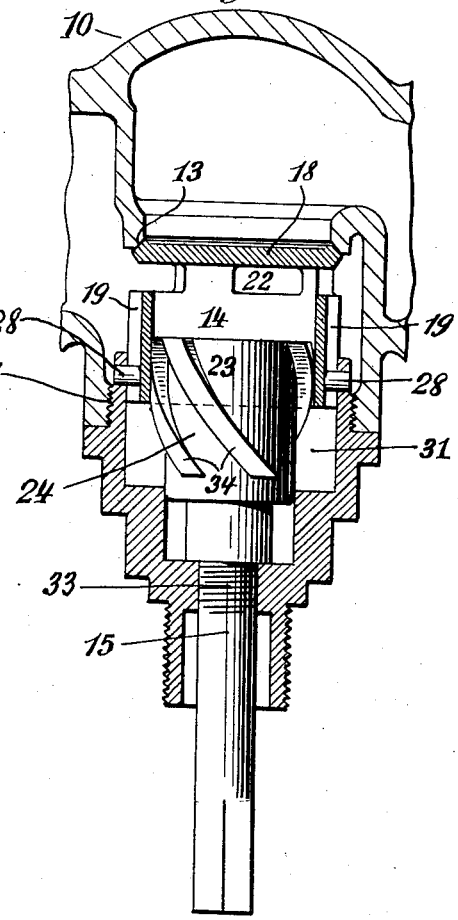
Fig. 2 is a similar view showing the valve in closed position with parts omitted and broken away.
Figure 3:
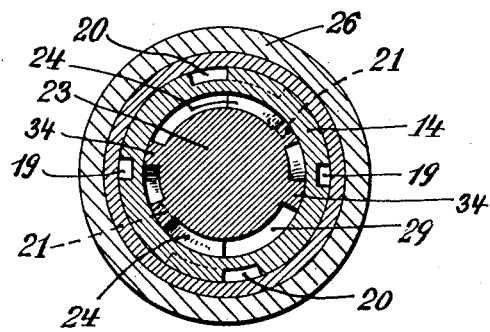
Fig. 3 is a transverse sectional view on line 3—3 of Figure 1.
Figure 4:
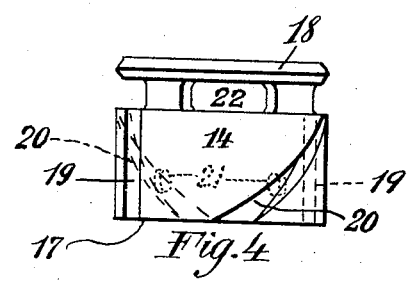
Fig. 4 is a side view of the valve head.

Referring to Figures 1 to 4, the reference numeral 10 denotes the valve body having threaded openings 11 and 12 for inlet and outlet and a valve seat 13. The valve proper comprises the head 14 and the stem 15. The valve head, Figure 4, is in the form of a cylinder 14 with one end 17 open and the other end 18 closed.

The outside of the cylinder is provided with two oppositely disposed straight slots 19, 19 parallel to the axis of the cylinder, and with two curved slots 20, 20, likewise disposed in diametrically opposite relation. The inside of the cylinder carries two pins 21, 21, and the cylinder wall adjacent the closed end 18 is provided with cut out portions 22, 22.

The valve stem 15 has an operating stem head 23 provided with two diametrically disposed spiral grooves 24, 24 formed between projecting ridges or flanges 34. The stem head 23 fits inside the cylinder 14, the two spiral grooves 24 engaging the pins 21. The stem 15 projects outside the valve mechanism through a stuffing box 25 which closes the outer end of the valve casing 26 screwed into the valve body 10 at 27. The valve casing 26 carries two diametrically disposed pins 28, 28 adapted to be engaged by either the straight slots 19 or the curved slots 20 in the cylinder head 14.

For the purpose of permitting water to pass around and through the valve so as to equalize the pressure, the parts are so designed that there is a space 29 between the operating stem head 23 and the cylinder head 14, see Figure 3. When the valve is closed as in Figure 2, there is also a relatively large annular chamber 31 adapted to receive water through the cut out portions 22 and the spiral grooves 24 or straight slots 19.

The valve stem 15 is threaded into the casing at 33 and is operated by means of a suitable handle 30.

In operation the valve stem 23 is inserted within the valve head cylinder 14 so that the curved valve stem slots 24 engage the pins 21 within the cylinder 14. The latter is then placed within the casing 26 so that the pins 28 in the latter are engaged either by the straight slots 19, as shown, or by the curved slots 20.

Figure 1:
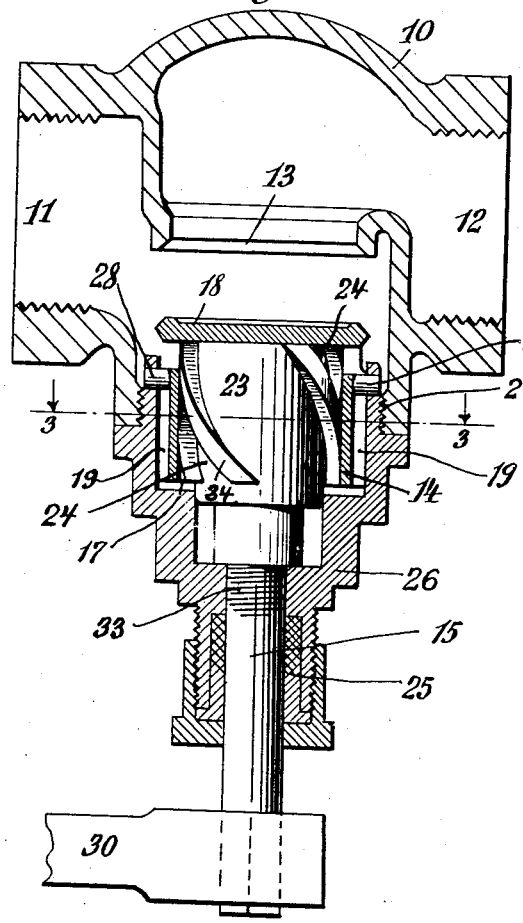

In the open position as in Figure 1, water or other liquid may flow freely through the valve from 11 to 12 or vice versa. The water also flows through the openings 22, around the operating head 23 and into the spaces 29 between the head 23 and cylinder 14, thus equalizing the pressure.

The valve is closed by giving the stem 15 a slight turn, whereby the curved slots 24 on the operating head 23 forcibly engage the pins 21 and thereby propel the cylinder head into closed position as in Figure 2. During the outward or closing movement, the cylinder head 14 is forced to move axially with the stem 15 because the straight slots 19 ride on the casing pins 28.

It takes but a very slight turn of the stem 15 to quickly close the valve by a straight— or rotary—movement of the cylinder head. This movement is assisted as it were or made easier because of the equalized pressure within the valve. The valve thereafter is tightly seated against the seat 13 because of the threads 33 on the stem 15 which prevents accidental sliding opening movement of the valve due to the pressure on the closed end 18. The turning movement of the valve stem in opening or closing the valve is so slight that no perceptible axial movement occurs because of the threads 33.

In the modification shown in Figures 5 and 6 the reference number 35 denotes the valve head which is provided with two oppositely disposed spiral slots or grooves 36, 36 and two straight slots 37, 37 spaced at right angles to said groove. The head 35 carries a resiliently mounted plunger 38 adapted to close the valve by engaging the seat 13 as will be understood.

The spiral or curved slots 36 ride on pins 39, 39 fast in the valve casing 40. The head has further a recess 41 which affords space for the actuating head 42 of the valve stem 43. The head 42 has two keys 44, 44 which engage the aforesaid straight slots 37. The stem is threaded into the valve casing at 33 as in Figure 1. 45 is a stuffing box.

The valve is closed by giving the stem 43 a slight turn whereby the keys 44 turn the head 35 compelling it to ride outward with a rotary movement on the pins 39 engaged by the spiral or curved slots 36. The plunger 38 seats on the seat 13 with an easy yielding movement preventing jamming and shocks. The threads 33 prevent accidental opening or leakage.

Figures 7 and 8 show the invention embodied in a check valve in which the valve 50 is seated against the valve seat 13 by a spring 51 within the casing 52 and the head.

The valve head has two straight slots 54, 54 and two spiral or curved slots 55, 55. It may be placed so that either pair of slots engage the pins 56, 56 in the casing. As shown in the drawing, the spiral slots engage the pins.

When the water pressure overcomes the resistance of the spring 51, the valve is opened and recedes from the seat with a rotary movement caused by the engagement of the curved slots 55 with the pins 56 or by a straight receding movement if the straight slots engage the pins.

The rotary movements of the valve heads make for less wear and more smooth and easy operation. The opening and closing movements of the valve is very rapid.

I claim:

1. A valve mechanism comprising a valve body having a seat, a valve casing secured to said body, a hollow body forming a valve head, pins on the inside thereof, a valve stem having grooves fitting over said pins, means for causing operative engagement between the said means and grooves to actuate the valve head and co-operating means between said valve head and casing for selectively translating said actuating movement into a non-rotary or rotary movement of the valve head towards and away from the valve seat.

2. A valve mechanism comprising a valve body having a seat, a valve casing secured thereto, projections in said valve casing, a hollow cylindrical valve head provided with a pair of diametrically oppositely disposed straight grooves and a pair of diametrically oppositely disposed curved grooves spaced at right angles to the said straight grooves, either of said pair of grooves being adapted to engage the said projections in the valve casing, pins projecting inwardly from said valve head, a valve stem having curved grooves for engagement with said pins and means for operating the valve stem.

3. A valve mechanism comprising a valve body having a seat, a valve casing secured thereto, projections in said valve casing, a hollow cylindrical valve head provided with a pair of diametrically oppositely disposed straight grooves and a pair of diametrically oppositely disposed curved grooves spaced at right angles to the said straight grooves, either of said pair of grooves being adapted to engage the said projections in the valve casing, pins projecting inwardly from said valve head, a valve stem in threaded engagement with the said casing and provided with curved grooves for engagement with said pins and means for operating the valve stem.

Signed at New York in the county of New York and State of New York this 24th day of March, A. D. 1930.

HENRY G. KLETT.